(12) United States Patent
Shiotani

(10) Patent No.: US 12,131,078 B2
(45) Date of Patent: Oct. 29, 2024

(54) NON-TRANSITORY COMPUTER-READABLE RECORDING MEDIUM STORING COMPUTER-READABLE INSTRUCTIONS FOR TERMINAL DEVICE, TERMINAL DEVICE, AND METHOD FOR CONTROLLING TERMINAL DEVICE

(71) Applicant: BROTHER KOGYO KABUSHIKI KAISHA, Nagoya (JP)

(72) Inventor: Takeshi Shiotani, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/145,894

(22) Filed: Dec. 23, 2022

(65) Prior Publication Data

US 2023/0205467 A1 Jun. 29, 2023

(30) Foreign Application Priority Data

Dec. 27, 2021 (JP) .................................. 2021-212911

(51) Int. Cl.
*G06F 3/12* (2006.01)

(52) U.S. Cl.
CPC ............ *G06F 3/121* (2013.01); *G06F 3/1274* (2013.01)

(58) Field of Classification Search
CPC ....... G06F 3/121; G06F 3/1236; G06F 3/1235
USPC ...................... 358/1.15; 399/24, 27; 347/214
See application file for complete search history.

(56) References Cited

U.S. PATENT DOCUMENTS

| 2010/0049636 | A1* | 2/2010 | Sawada | G06Q 10/087 |
| | | | | 705/28 |
| 2017/0094104 | A1 | 3/2017 | Fujiwara | |
| 2017/0223127 | A1* | 8/2017 | Matsutani | H04L 67/55 |
| 2021/0271433 | A1 | 9/2021 | Hirai | |

FOREIGN PATENT DOCUMENTS

| JP | 2000069216 A | 3/2000 |
| JP | 2017068574 A | 4/2017 |
| JP | 2021141365 A | 9/2021 |

* cited by examiner

*Primary Examiner* — Jamares Q Washington
(74) *Attorney, Agent, or Firm* — Scully, Scott, Murphy & Presser, P.C.

(57) ABSTRACT

A terminal device may receive notification information from a notification server and receive device related information which is related to a communication device from the communication device. The terminal device may, in a case where a predetermined condition related to the device related information is satisfied, display the notification information on a display of a terminal device, and in a case where the predetermined condition is not satisfied, not display the notification information on the display.

20 Claims, 9 Drawing Sheets

NON-TRANSITORY COMPUTER-READABLE RECORDING MEDIUM STORING COMPUTER-READABLE INSTRUCTIONS FOR TERMINAL DEVICE, TERMINAL DEVICE, AND METHOD FOR CONTROLLING TERMINAL DEVICE

REFERENCE TO RELATED APPLICATIONS

This application claims priority from Japanese Patent Application No. 2021-212911 filed on Dec. 27, 2021. The entire content of the priority application is incorporated herein by reference.

BACKGROUND ART

A communication system including a cellphone, a printer and a push notification server is known. The cellphone sends acquisition request information for a push notification ID to the server, receives the push notification ID from the push notification server and sends the push notification ID to the printer. The printer sends the push notification ID to the push notification server. When the push notification server receives the push notification ID from the printer, the push notification server sends the push notification information to the cellphone. When the cellphone receives the push notification information from the push notification server, the cellphone displays a notification image.

DESCRIPTION

The present disclosure provides a technique for enhancing user convenience.

The disclosure discloses a non-transitory computer-readable recording medium storing computer-readable instructions for a terminal device. The terminal device may comprise: a processor: and a display. The computer-readable instructions, when executed by the processor, may cause the terminal device to: receive notification information from a notification server; receive device related information which is related to a communication device from the communication device; in a case where a predetermined condition related to the device related information is satisfied, display the notification information on the display; and in a case where the predetermined condition is not satisfied, not display the notification information on the display.

According to the above configuration, the terminal device receives the notification information from the notification server. The terminal device receives the device related information related to the communication device from the communication device. When the predetermined condition related to the device related information is satisfied, the terminal device displays the notification information on the display, while the terminal device does not display the notification information on the display when the predetermined condition is not satisfied. As described above, depending on whether the predetermined condition related to the device related information is satisfied, whether to display the notification information can be changed. Accordingly, user convenience can be enhanced.

A computer-readable recording medium storing the above computer-readable instructions, a terminal device implemented by the computer-readable instructions and a method for controlling the above terminal device are also novel and useful. A communication system comprising the above terminal device, the notification server and the communication device is also novel and useful.

FIG. 10 illustrates an example of the pull notification screen displayed after an Internet connection of an MFP is established or after the MFP is powered on.

Figure 1:
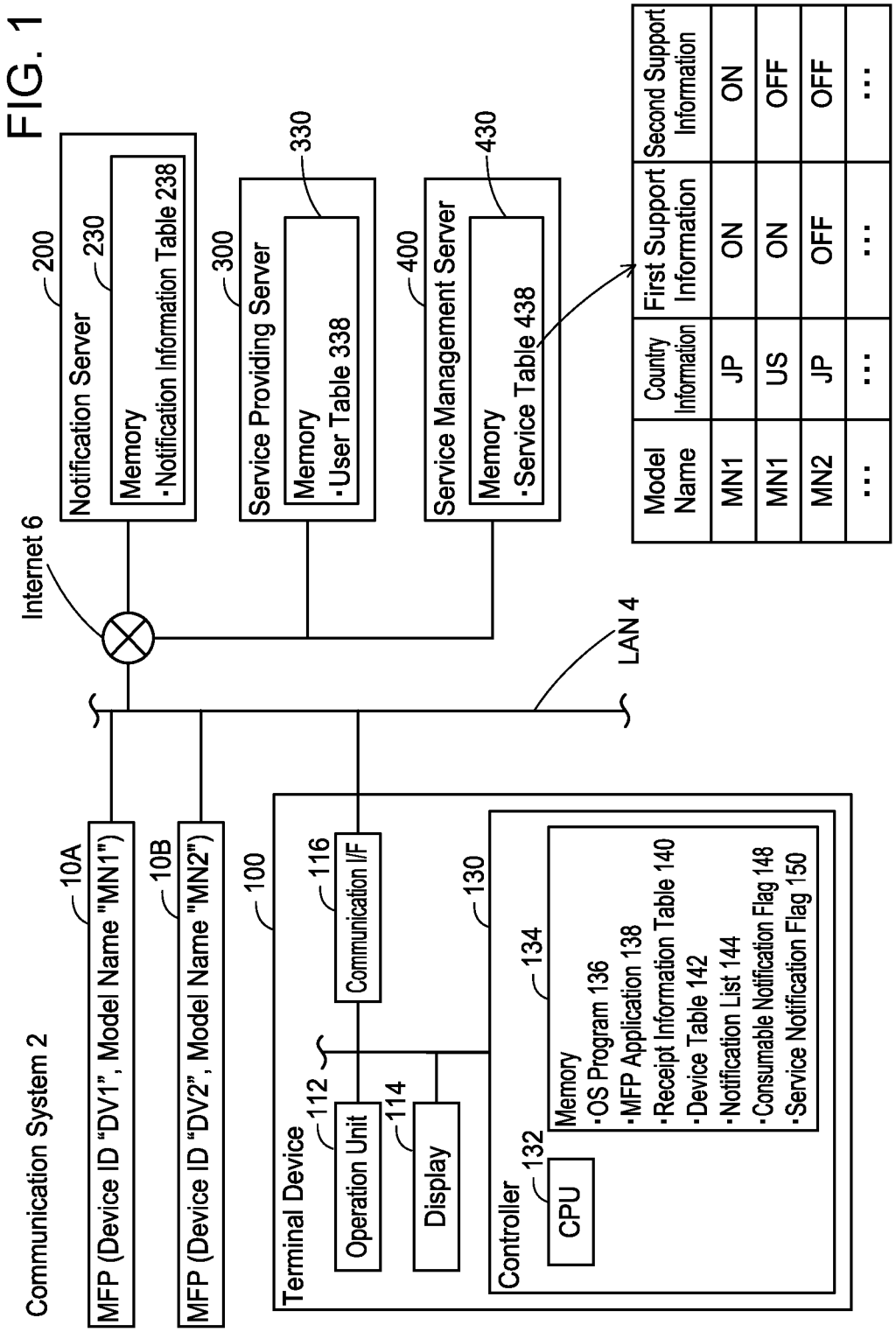
FIG. 1 illustrates a configuration of a communication system.

EMBODIMENT (Configuration of Communication System 2; FIG. 1)

As illustrated in FIG. 1, a communication system 2 includes a plurality of MFPs 10A, 10B, a terminal device 100, a notification server 200, a service providing server 300 and a service management server 400. The MFPs 10A, 10B and the terminal device 100 are connected to Local Area Network (LAN) 4. The MFPs 10A, 10B and the terminal device 100 are configured to communicate with each other via the LAN 4. The LAN 4 is connected to the Internet 6. The MFPs 10A,10B, the terminal device 100, the notification server 200, the service providing server 300 and the service management server 400 are connected to the Internet 6. The MFPs 10A, 10B, the terminal device 100, the notification server 200, the service providing server 300 and the service management server 400 are configured to communicate with each other via the Internet 6.

(Configurations of MFPs 10A, 10B)

The MFPs 10A, 10B are peripheral devices configured to execute a print function and a scan function (i.e., peripheral devices of a PC, etc.). The MFP 10A has a device name "DV1" and a model name "MN1". The MFP 10B has a device name "DV2" and a model name "MN2". The device name is a name given by an administrator of the MFPs to each of the MFPs 10A, 10B. The Model name is a name representing a model of each MFP. The MFPs 10A, 10B are manufactured by the same vendor. Hereafter, the MFP 10A and the MFP 10B may collectively be referred to as "MFP(s) 10".

(Configuration of Terminal Device 100)

The terminal device 100 is a portable terminal device such as a cell phone (e.g., a smartphone), a PDA or a tablet PC. The terminal device 100 includes an operation unit 112, a display 114, a communication interface 116 and a controller 130. Hereafter, the interface will be referred to as "I/F".

The operation unit 112 is for example a touch screen. The operation unit 112 is configured to accept various instructions. The display 114 displays various kinds of information. The display 114 may be a panel or a display device. The communication I/F 116 is connected to the LAN 4.

The controller 130 includes a CPU 132 and a memory 134. The CPU 132 executes various processes in accordance with an Operating System (OS) program 136 (hereafter simply be referred to as "OS 136") stored in the memory 134. The memory 134 further stores an MFP application 138 (hereafter simply be referred to as "app 138"), a receipt information table 140, a device table 142, a notification list 144, a prohibited screen list 146, a consumable notification flag 148, and a service notification flag 150. The app 138 is a program to cause the MFPs 10A, 10B to execute the print function and the scan function. The notification list 144 is a list of pull notification to be displayed. The consumable notification flag 148 indicates a value that is either "ON" indicating that a pull notification screen related to a consumable is allowed to pop up or "OFF" indicating that the pull notification screen related to a consumable is prohibited to pop up. The service notification flag 150 indicates a value that is either "ON" indicating that a pull notification screen related to a service provided by the service providing server 300 is allowed to pop up or "OFF" indicating that the pull notification screen related to this service is prohibited to pop up. The consumable notification flag 148 and the service notification flag 150 can be set by a user.

(Configuration of Notification Server 200)

The notification server 200 is provided on the Internet 6 by a provider different from the vendor of the MFP 10. In a modification, the notification server 200 may be provided on the Internet 6 by this vendor. In another modification, the vendor of the MFP 10 may use an environment provided by an external cloud computing service without preparing its own hardware for the notification server 200. In this case, the vendor of the MFP 10 may implement the notification server 200 by preparing a program (i.e., a software) for the notification server 200 and introducing it to the above environment. The notification server 200 is a server configured to provide push notification information including push notification screen data and pull notification information including pull notification screen data. The pull notification information is data sent from the notification server 200 to the terminal device 100 in response to a pull notification information request for requesting the notification server 200 to send the pull notification information being sent from the terminal device 100 to the notification server 200. The push notification information is data automatically sent from the notification server 200 to the terminal device 100 without the push notification information request for requesting the notification server 200 to send the push notification information being sent from the terminal device 100 to the notification server 200. The push notification information and the pull notification information are registered in the notification server 200 in response to the vendor providing the notification server 200 being requested to do so by the vendor of the MFP 10, or the like. In other words, a timing condition in the pull notification information (to be described later) is a condition set by the notification server 200. The notification server 200 includes a memory 230. The memory 230 stores the notification information table 238.

(Configurations of Service Providing Server 300 and Service Management Server 400)

The service providing server 300 and the service management server 400 are provided on the Internet 6 by the vendor of the MFP 10. In a modification, the service providing server 300 and the service management server 400 may be provided on the Internet 6 by a provider different from this vendor. In another modification, the vendor of the MFP 10 may use an environment provided by an external cloud computing service without preparing its own hardware for the service providing server 300 and the service management server 400. In this case, the vendor of the MFP 10 may implement the service providing server 300 and the service management server 400 by preparing a program (i.e., a software) for the service providing server 300 and the service management server 400 and introducing it to the above environment.

The service providing server 300 is a server for providing a service related to the MFP 10. The service providing server 300 provides a remote print service and a flat-rate service. In a modification, the service providing server 300 may further provide a push scan service and the like. The remote print service is a service for sending a print instruction to the MFP 10 via the service providing server 300 from outside home or office. The flat-rate service is a service of charging predetermined fees when the number of sheets printed in a predetermined period (e.g., one month) is equal to or less than the contractual number of print sheets (e.g., 1000 sheets). This service charges a flat-rate fee as above and also an additional fee that is dependent on the number of printed sheets exceeding the contractual number of printed sheets when the number of sheets printed in the predetermined period exceeds the contractual number of printed sheets (hereafter this service may be referred to as "flat-rate service"). The flat-rate service includes an automatic ordering service of automatically ordering a new cartridge when a remaining amount of ink in the cartridge attached to the MFP 10 is equal to or less than a predetermined remaining amount. The service providing server 300 includes a memory 330. A user table 338 is stored in the memory 330.

The service management server 400 is a server for managing support information of the remote print service and the flat-rate service. The service management server 400 includes a memory 430. A service table 438 is stored in the memory 430. In the service table 438, a model name, country information (e.g., "JP", "US"), first support information and second support information are stored in association with each other. The first support information indicates a value that is either "ON" indicating the remote print service is supported or "OFF" indicating that the remote print service is not supported. The second support information indicates a value that is either "ON" indicating that the flat-rate service is supported or "OFF" indicating that the flat-rate service is not supported.

Figure 2:
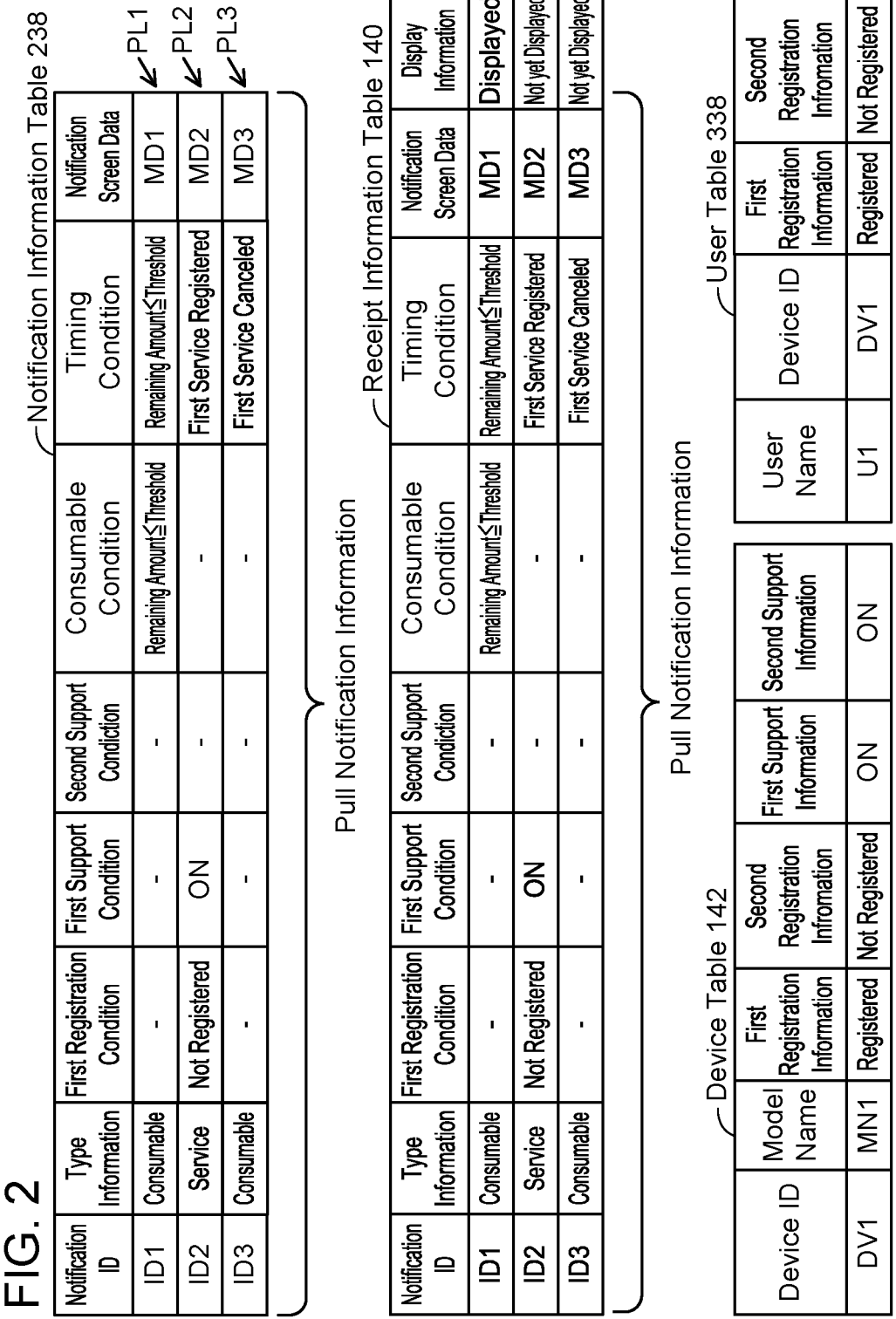
FIG. 2 illustrates examples of tables.

(Configurations of Tables; FIG. 2)

Next, with reference to FIG. 2, contents of the receipt information table 140 and the device table 142 in the terminal device 100, the notification information table 238 in the notification server 200, and the user table 338 in the service providing server 300 will be described.

The notification information table 238 in the notification server 200 is a table for managing pull notification information (e.g., PL1 to PL3). The pull notification information includes a notification ID for identifying the pull notification information, type information, a timing condition and pull notification scree data corresponding to a pull notification screen. The type information indicates one of "consumable" indicating that the pull notification screen is a screen related to a consumable and "service" indicating that the pull notification screen is a screen related to a service. The timing condition is information indicating a timing at which the pull notification screen is to pop up. Details of the timing condition will be described later. The pull notification information may further include a first registration condition, a first support condition, a second support condition, and a consumable condition. The respective conditions are information to limit a target screen on which the pull notification screen is pop-up displayed. The first registration condition is information indicating a condition to change whether to pop up the pull notification screen or not depending on whether the MFP 10 is registered in the remote print service. The first registration condition includes one of "registered" indicating that the pull notification is pop-up displayed when the MFP 10 is already registered to the remote print service and "not registered" indicating that the pull notification screen is pop-up displayed when the MFP 10 is not registered to the remote print service. The first support condition is information indicating a condition to change whether to pop up the pull notification screen depending on whether the MFP 10 registered in the app 138 supports the remote print service. The first support condition includes "ON" indicating that the pull notification screen is pop-up displayed when the remote print service is supported. The second support condition is information indicating a condition to change whether to pop up the pull notification screen depending on whether the MFP 10 registered in the app 138 supports the flat-rate service. The second support condition may include "ON" indicating that the pull notification screen is pop-up displayed when the flat-rate service is supported. The consumable condition is information indicating a condition to change whether to pop up the pull notification screen depending on the status of a consumable (in the present embodiment, a cartridge) attached to the MFP 10 registered in the app 138. The consumable condition includes "remaining amount≤threshold" indicating that the pull notification screen is pop-up displayed when the remaining amount of the cartridge is equal to or lower than a threshold (e.g., "30").

The receipt information table 140 in the terminal device 100 is a table to manage pop-up display of the pull notification information received from the notification server 200. In the receipt information table 140, the pull notification information (e.g., PL1 to PL3) and display information are stored in association with each other. The display information indicates one of "displayed" indicating that the pull notification screen corresponding to the display information has already been pop-up displayed and "not yet displayed" indicating that this notification screen has not been pop-up displayed yet.

The device table 142 in the terminal device 100 is a table for managing information related to the MFP 10 registered in the app 138. In the device table 142, a device ID, a model name, first registration information, second registration information, first support information and second support information are stored in association with each other. The first registration information indicates one of "registered" indicating that the remote print service is provided to the user of the MFP 10 and "not registered" indicating that the remote print service is not provided to the user of the MFP 10. The second registration information indicates one of "registered" indicating that the flat-rate service is provided to the user of the MFP 10 and "not registered" indicating that the flat-rate service is not provided to the user of the MFP 10.

The user table 338 in the service providing server 300 is a table for managing information related to the user. In the user table 338, a user name for identifying the user, the device ID, the first registration information and the second registration information are stored in association with each other. The user ID is registered when the user subscribes to the remote print service or the flat-rate service.

Figure 3:
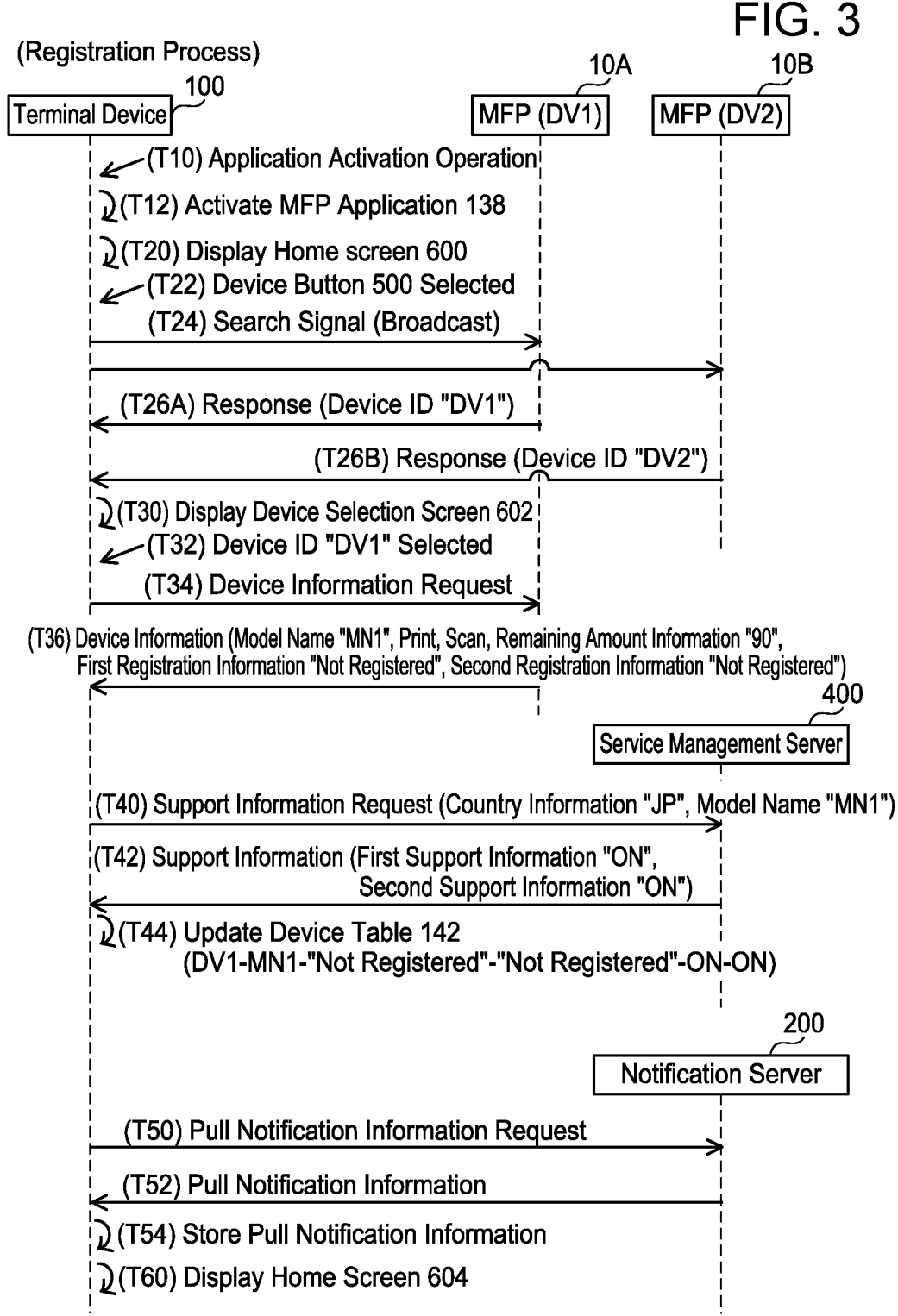
FIG. 3 illustrates a sequence diagram of a registration process.
Figure 4:
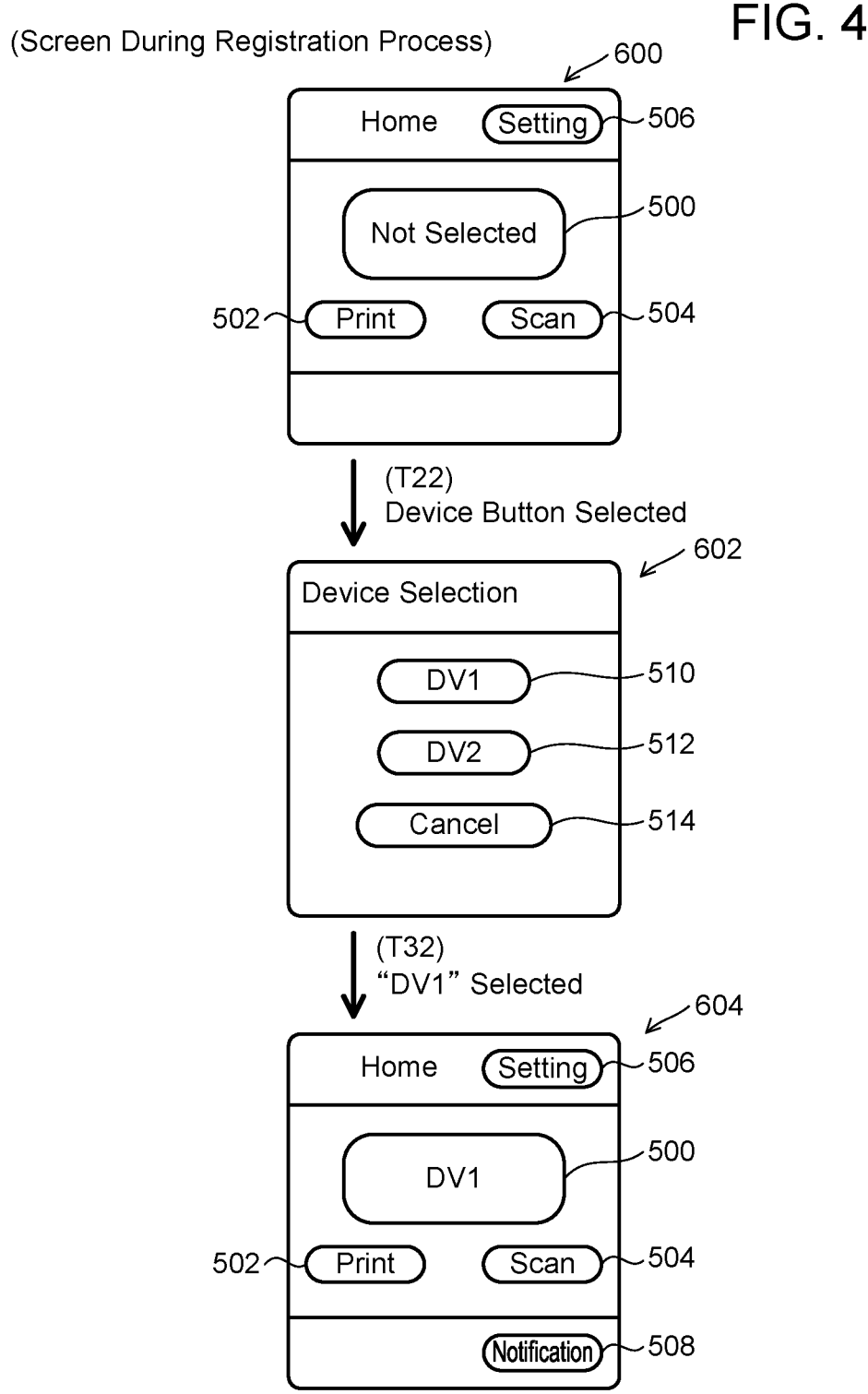
FIG. 4 illustrates examples of screens displayed on a terminal device during the registration process.

(Registration Process; FIG. 3, FIG. 4)

A registration process will be described with reference to FIG. 3 and FIG. 4. The registration process is a process for registering the MFP 10A in the app 138. Hereafter, all the communication executed between the terminal device 100 and other devices (MFP 10, the notification server 200, the service providing server 300 and the service management server 400) are executed via the communication I/F 116 of the terminal device 100. Accordingly, the recitation "via the communication I/F 116" will be omitted. Further, hereafter when the process executed by the CPU 132 of the terminal device 100 in accordance with the OS 136 or the app 138 is explained, the OS 136 or app 138 will be described as a subject of the processes.

When the OS 136 of the terminal device 100 accepts an operation to activate the app 138 in T10, the OS 136 supplies an activation instruction to the app 138 in T12. The app 138 is activated in response to acquiring the activation instruction from the OS 136. Next, the app 138 displays the home screen 600 on the display 114. Specifically, the app 138 supplies a display instruction for displaying the home screen 600 to the OS 136 and the OS 136 displays the home screen 600 on the display 114. In other words, the app 138 displays the home screen 600 on the display 114 via the OS 136. Hereafter, the recitation "via the OS 136" in the cases where the app 138 instructs to display a screen on the display 114 will be omitted. As illustrated in FIG. 4, the home screen 600 includes a device button 500, a print button 502, a scan button 504 and a setting button 506. The setting button 506 is a button for displaying a setting screen (not illustrated) on which settings of the consumable notification flag 148 and the service notification flag 150 can be changed. On the device button 500, a device name (e.g., "DV1", "DV2") of an MFP registered as an MFP which is to execute a print function or a scan function, or information "not selected" indicating that an MFP which is to execute a printing function or a scan function is not registered is displayed. In the present process, the information "not selected" indicating that an MFP which is to execute a printing function or a scan function is not selected is displayed on the device button 500.

When the app 138 accepts selection of the device button 500 in T22 of FIG. 3, the app 138 broadcasts a search signal in T24. Specifically, the app 138 supplies, to the OS 136, a sending instruction for causing the OS 136 to send the search signal and the OS 136 broadcasts the search signal. In other words, the app 138 broadcasts the search signal via the OS 136. Hereafter, the recitation "via the OS 136" in the cases in which the app 138 sends a signal to an external device (e.g., the MFP 10A) will be omitted. The search signal is a signal for requiring each of one or more peripheral devices (e.g., MFPs 10A, 10B) connected to the LAN 4 to send a response signal including a device ID of the peripheral device. The app 138 receives a response including the device ID "DV1" from the MFP 10A in T26A and receives a response including the device ID "DV2" from the MFP 10B in T26B. Specifically, the OS 136 receives the response including the device ID "DV1" from the MFP 10A and the app 138 acquires the response including the device ID "DV1" from the OS 136. In other words, the app 138 receives the response from the MFP 10A via the OS 136. Hereafter, the recitation "via the OS 136" in the cases in which the app 138 receives a signal from an external device (e.g., the MFP 10A) will be omitted. Next, the app 138 displays a device selection screen 602 on the display 114 in T30. As illustrated in FIG. 4, the device selection screen 602 includes a first device selection button 510 including the device ID "DV1", a second device selection button including the device ID "DV2" and a cancel button 514.

When the app 138 accepts selection of the first device selection button 510 (i.e., the device ID "DV1") in T32 of FIG. 3, the app 138 sends a device information request to the MFP 10A having the device ID "DV1" in T34. The device information request is a signal requesting for sending of device information including the model name of the MFP 10, functions which the MFP 10 can execute, remaining amount information indicating a remaining amount of a cartridge attached to the MFP 10, the first registration information and the second registration information. In T36, the app 138 receives the device information including the model name "MN1", the print function, the scan function, the remaining amount information "90", the first registration information "not registered" and the second registration information "not registered" from the MFP 10A. The device information may include one of power information and connection completion information. The power information is information indicating that the power of the MFP 10 has been turned on from off, and is included only in the device information sent for the first time since the power of the MFP 10 has been turned on from off. The connection completion information is information indicating that the MFP 10 has been connected (and is currently connected) to the Internet 6, and the connection completion information is included only in the display information sent for the first time since the MFP 10 has been connected to the Internet 6.

In T40, the app 138 sends, to the service management server 400, a support information request including the country information "JP" indicating that a country where the MFP 10A is set up is Japan and the model name "MN1". The support information request is a signal requesting for sending of first support information and second support information associated with the country information and the model name in the request.

When the service management server 400 receives the support information request from the terminal device 100 in T40, the service management server 400 identifies, in the service table 438, the first support information "ON" and the second support information "ON" associated with the model name "MN1" and the country information "JP" in the request. Then, in T42, the service management server 400 sends support information including the first support information "ON" and the second support information "ON" to the terminal device 100.

When the app 138 receives the support information from the service management server 400 in T42, the app 138 stores the received device ID "DV1" (see T26A), the received model name "MN1" (see T36), the received first registration information "not registered" (see T36), the received second registration information "not registered" (see T36), the received first support information "ON" (see T42) and the received second support information "ON" (see T42) in the device table 142 in association with each other in T44. Specifically, the app 138 supplies an instruction to store the respective information (the device ID "DV1", the model name "MN1", the first registration information "not registered", the second registration information "not registered", the first support information "ON" and the second support information "ON") to the OS 136 and the OS 136 stores the information in the device table 142. In other words, the app 138 stores the respective information in the device table 142 via the OS 136. Hereafter, the recitation "via the OS 136" in the cases in which the app 138 stores information in the memory 134 will be omitted. Thereafter, the app 138 periodically (e.g., every 24 hours) sends the support information request to the service management server 400. In other words, the app 138 repeatedly sends the support information request to the service management server 400.

Next, the app 138 sends the pull notification information request to the notification server 200 in T50. The pull notification information request is a signal requesting for sending of the pull notification information which the notification server 200 stores. The app 138 receives the pull notification information from the notification server 200 in T52 and stores the pull notification information in T54. Specifically, the app 138 stores the received pull notification information and the display information "not yet displayed" in the receipt information table 140 in association with each other. Then, the app 138 displays the home screen 604 on the display 114 in T60. As illustrated in FIG. 4, the home screen 604 is the same as the home screen 600 except that the device ID "DV1" is displayed on the device button 500 and includes a notification button 508. The notification button 508 is a button for displaying a notification list screen including a list of the pull notification information in the receipt information table 140. When T60 ends, the registration process ends. Consequently, the user can use the terminal device 100 to cause the MFP 10A to execute a print function and a scan function. Thereafter, the app 138 periodically (e.g., every 12 hours) receives the device information from the MFP 10A.

Figure 5:
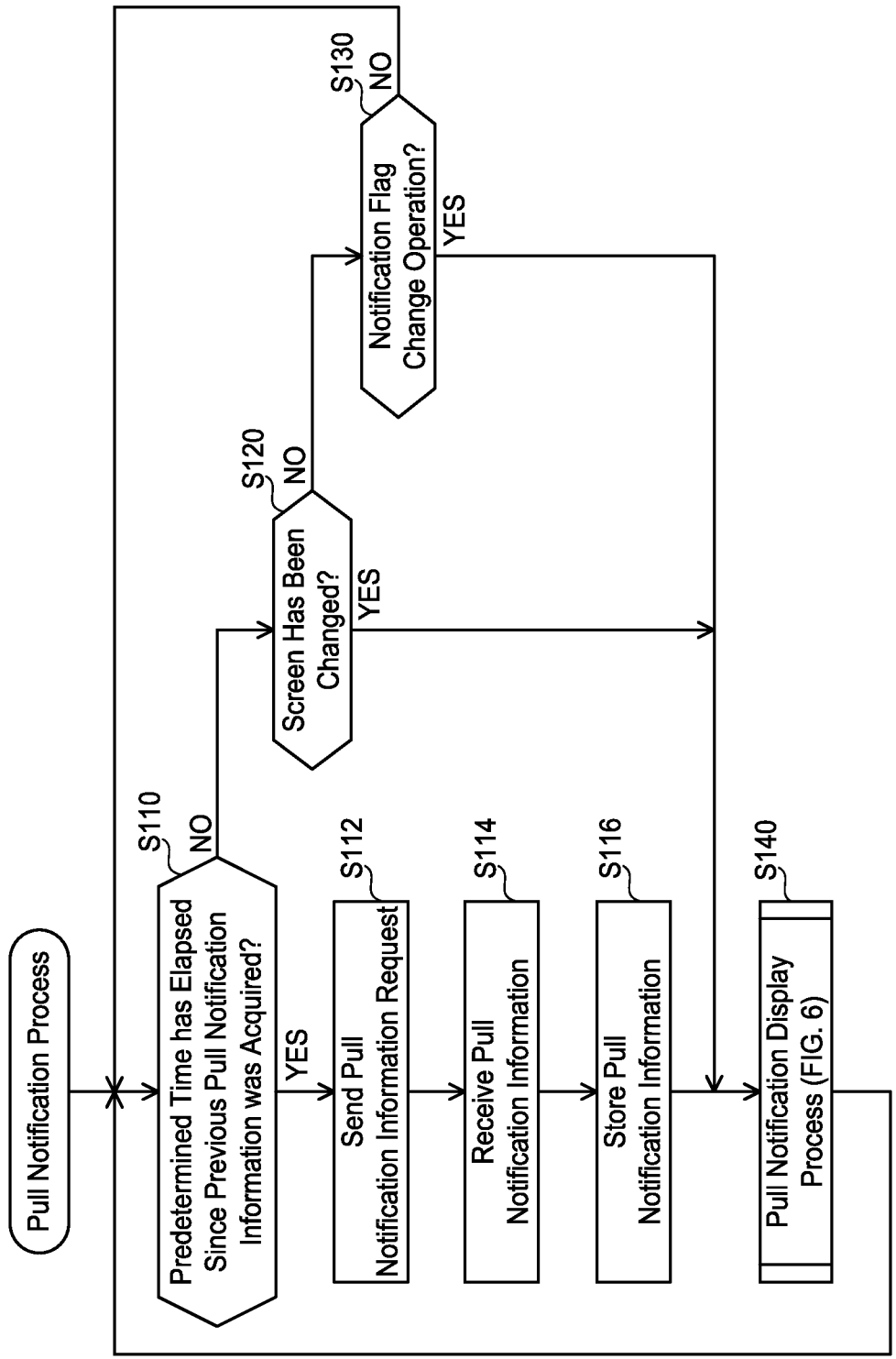
FIG. 5 illustrates a flowchart of a pull notification process.
Figure 6:
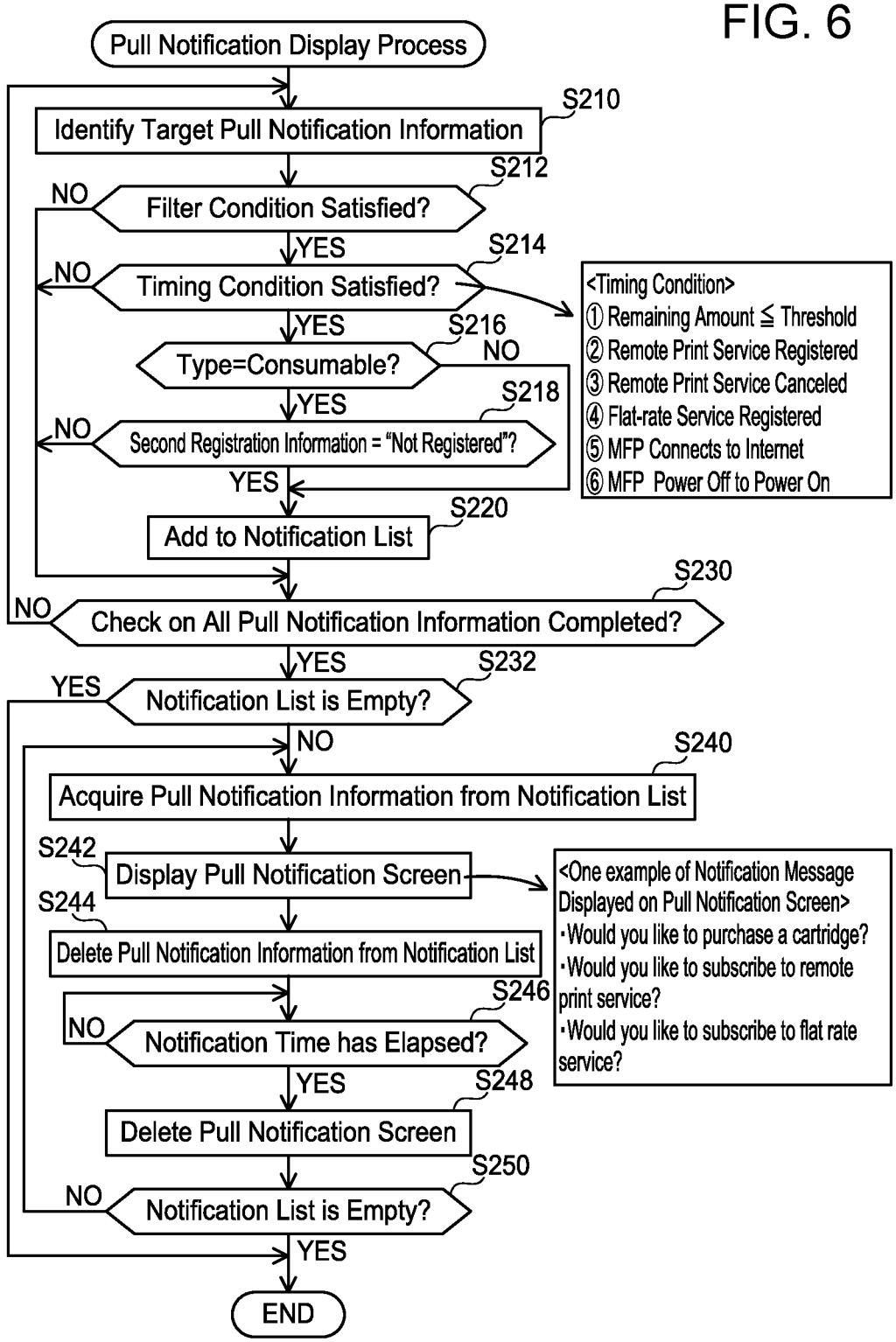
FIG. 6 illustrates a flowchart of a pull notification display process.

(Pull Notification Display Process; FIG. 5, FIG. 6)

Next, with reference to FIG. 5 and FIG. 6, a pull notification process executed by the app 138 will be described. The app 138 starts the process of FIG. 5 when the app 138 is activated after the registration process (see FIG. 3) has been completed.

In S110, the app 138 monitors a predetermined time (e.g., 24 hours) having elapsed since the pull notification information was previously received from the notification server 200. When the predetermined time has elapsed since the pull notification information was previously received from the notification server 200, the app 138 determines YES in S110 and proceeds to S112.

The app 138 sends the pull notification information request to the notification server 200 in S112 and receives the pull notification information from the notification server 200 in S114. Next, in S116, the app 138 stores the received pull notification information and the display information "not yet displayed" in association with each other in the receipt information table 140. When S116 ends, the app 138 proceeds to S140.

At the same time as the monitoring in S110, the app 138 determines if the screen displayed on the display 114 has been changed in S120. When the app 138 determines that the screen displayed on the display 114 has been changed, the app 138 determines YES in S120 and proceeds to S140.

Further, at the same time as the monitoring of S110 and S120, the app 138 determines whether the app 138 has accepted an operation to change either the consumable notification flag 148 or the service notification flag 150 (hereafter this operation may be referred to as "notification flag change operation") in S130. When the app 138 accepts the notification flag change operation, the app 138 determines YES in S130 and proceeds to S140.

In S140, the app 138 executes a pull notification display process (see FIG. 6). The pull notification display process is a process to determine whether to pop up the pull notification screen on the display 114. When the process of S140 ends, the app 138 returns to S10.

(Pull Notification Display Process; FIG. 6)

Next, with reference to FIG. 6, the pull notification display process executed in S140 of FIG. 5 will be described. In S210, the app 138 identifies one piece of pull notification information associated with the display information "not yet displayed" in the receipt information table 140 as target pull notification information.

In S212, the app 138 determines whether a filter condition is satisfied by using the target pull notification information. The app 138 proceeds to S214 when the filter condition is satisfied (YES in S212), while the app 138 proceeds to S220 when the filter condition is not satisfied (NO in S212). Hereafter, the process of determining whether the filter condition is satisfied (hereafter the process may be referred to as "filter condition process") will be described. First, the app 138 identifies the type information in the target pull notification information ("consumable" or "service"). Then, the app 138 determines whether the notification flag corresponding to the identified type information (the consumable notification flag 148 or the service notification flag 150) is "ON" or not. When the notification flag corresponding to the identified type information is "OFF", the app 138 determines that the filter condition is not satisfied (NO in S212). On the other hand, when the notification flag corresponding to the identified type information is "ON", the app 138 continues the filter condition process. Next, the app 138 determines whether the target pull notification information includes the first registration condition or not. When the target pull notification information includes the first registration condition, the app 138 determines whether the first registration condition and the first registration information of the selected MFP 10 in the device table 142 match or not. When the first registration condition and the first registration information do not match, the app 138 determines that the filter condition is not satisfied (NO in S212). On the other hand, when the first registration condition and the first registration information match, the app 138 continues the filter condition process. Next, the app 138 determines whether the target pull notification information includes the first support condition or not. When the target pull notification information includes the first support condition, the app 138 determines whether the first support information of the selected MFP 10 in the device table 142 is "ON" or not. When the first support information is "OFF", the app 138 determines that the filter condition is not satisfied since the first support condition is not satisfied (NO in S212). On the other hand, when the first support information is "ON", the app 138 determines that the first support condition is satisfied and continues the filter condition process. When the target pull notification information does not include the first support condition as well, the app 138 continues the filter condition process. Next, the app 138 determines whether the target pull notification includes the second support condition. When the target pull notification information includes the second support condition, the app 138 determines whether the second support information of the selected MFP in the device table 142 is "ON" or not. When the second support information is "OFF", the app 138 determines that the filter condition is not satisfied since the second support condition is not satisfied (NO in S212). On the other hand, when the second support information is "ON", the app 138 determines that the second support condition is satisfied and continues the filter condition process. When the target pull notification information does not include the second support condition as well, the app 138 continues the filter condition process. Then, the app 138 determines whether the target pull notification information includes the consumable condition or not. When the target pull notification information includes the consumable condition, the app 138 determines whether the remaining amount indicated by the remaining amount information of the selected MFP 10 stored in the memory 134 is equal to or lower than a threshold in the consumable condition. When the remaining amount is greater than the threshold, the app 138 determines that the filter condition is not satisfied since the consumable condition is not satisfied (NO in S212). On the other hand, when the remaining amount is equal to or lower than the threshold, the app 138 determines that the consumable support condition is satisfied and determines that the filter condition is satisfied. When the target pull notification information does not include the consumable condition as well, the app 138 determines that the filter condition is satisfied. As described above, when the notification flag corresponding to the type information included in the target pull notification is "ON" and when all the conditions (except the timing condition) included in the target pull notification information are satisfied, the app 138 determines that the filter condition is satisfied (YES in S212).

In S214, the app 138 determines whether the timing condition is satisfied by using the target pull notification information. The timing condition is one of a condition related to a consumable (e.g., "remaining amount threshold"), a condition related to registration of the remote print service (e.g., "remote print service registered"), a condition related to cancelation of the remote print service (e.g., "remote print service canceled"), a condition related to registration of the flat-rate service (e.g., "flat-rate service registered"), a condition related to power of the MFP 10 (e.g., "power on"), and a condition related to an Internet connection of the MFP 10 (e.g., "Internet connection completed"). When the condition related to the consumable is the timing condition, the app 138 determines that the timing condition is satisfied in the case where information indicated by the remaining amount information included in the latest device information received from the MFP 10 is smaller than a threshold and the remaining amount indicated by the remaining amount information included in the device information previously received from the MFP 10 (hereafter referred to as "previous device information") is larger than the threshold (YES in S214). On the other hand, when the information indicated by the remaining amount information included in the latest device information is larger than the threshold, the app 138 determines that the timing condition is not satisfied (NO in S214). When the condition related to registration of the remote print service is the timing condition, the app 138 determines that the timing condition is satisfied in the case where the latest device information includes the first registration information "registered" and the previous device information includes the first registration information "not registered" (YES in S214). On the other hand, when the latest device information includes the first registration information "not registered", the app 138 determines that the timing condition is not satisfied (NO in S214). When the condition related to cancelation of the remote print service is the timing condition, the app 138 determines that the timing condition is satisfied in the case where the latest device information includes the first registration information "not registered" and the previous device information includes the first registration information "registered" (YES in S214). On the other hand, when the latest device information includes the first registration information "registered", the app 138 determines that the timing condition is not satisfied (NO in S214). When the condition related to registration of the flat-rate service is the timing condition, the app 138 determines that the timing condition is satisfied when the latest device information includes the second registration information "registered" and the previous device information includes the second registration information "not registered" (YES in S214). On the other hand, when the latest device information includes the second registration information "not registered", the app 138 determines that the timing condition is not satisfied (NO in S214). When it is determined that the timing condition is satisfied (YES in S214), the app 138 proceeds to S216, while the app proceeds to S230 when it is determined that the timing condition is not satisfied (NO in S214).

In S216, the app 138 determines that the type information in the target pull notification information is "consumable". When the type information in the target pull notification is "consumable" (YES in S216), the app 138 proceeds to S218 while the app 138 proceeds to S220 when the type information in the target pull notification information is not "consumable" (NO in S216).

In S218, the app 138 determines whether the second registration information of the selected MFP 10 in the device table 142 is "not registered". When the second registration information is "not registered" (YES in S218), the app 138 proceeds to S220 while the app 138 proceeds to S230 when the second registration information is not "not registered" (NO in S218).

In S220, the app 138 adds the target pull notification information to the notification list 144.

In S230, the app 138 determines whether the processes of S210 to S220 (hereafter the processes may be referred to as "notification check process") have been executed on all the pull notification information associated with the display information "not yet displayed" in the receipt information table 140. When the app 138 determines that the notification check process has been executed on all the pull notification information (YES in S230), the app 138 proceeds to S232 while when the app 138 determines that the notification check process is not performed on one or more pull notification information (NO in S230), the app 138 returns to S210. In other words, the app 138 repeats the notification check process until the notification check on all the pull notification information associated with the display information "not yet displayed" in the receipt information table 140 is completed.

In S232, the app 138 determines whether the notification list 144 is empty. When the notification list 144 is empty (YES in S232), the app 138 ends the process of FIG. 6. On the other hand, when the notification list 144 is not empty (NO in S232), the app 138 proceeds to S240.

In S240, the app 138 acquires one piece of pull notification information from the notification list 144.

In S242, the app 138 pop-up displays, on the display 114, the pull notification screen corresponding to the pull notification screen data included in the acquired pull notification information. On the pull notification screen, a message related to a cartridge (e.g., "would you like to purchase a cartridge?"), a message related to a remote print service (e.g., "would you like to subscribe to a remote print service?"), a message related to the flat-rate service (e.g., "would you like to subscribe to a flat-rate service?"), or the like.

In S244, the app 138 deletes the pull notification information corresponding to the acquired pull notification information from the notification list 144. Further, the app 138 changes the display information associated with the acquired pull notification information in the receipt information table 140 from "not yet displayed" to "displayed".

In S246, the app 138 determines whether a time which has elapsed since the pull notification screen was pop-up displayed exceeds a notification time (e.g., 10 seconds). When the elapsed time exceeds the notification time, the app 138 determines YES in S246 and proceeds to S248.

In S248, the app 138 deletes the pull notification screen from the display 114.

S250 is the same as S222. When the app 138 determines YES in S250, the app 138 ends the process of FIG. 6. On the other hand, when the app 138 determines NO in S250, the app 138 returns to S240. In other words, the app 138 repeatedly executes the processes of S240 to S248 until the notification list 144 becomes empty. In other words, the pull notification screen may be consecutively pop-up displayed on the display 114.

(Pull Notification Screen; FIG. 7 to FIG. 10)

Next, with reference to FIG. 7 to FIG. 10, the pull notification screen displayed on the display 114 of the terminal device 100 and the operation of the terminal device 100 when this pull notification screen is selected will be described. Hereafter, the case in which the pull notification screen is displayed on the home screen 604 (see FIG. 4) will be explained. Further, hereafter, a screen displayed on the display 114 by the app 138 will be illustrated with a thin line and a screen displayed on the display 114 by the OS 136 will be illustrated with a thick line.

Figure 7:
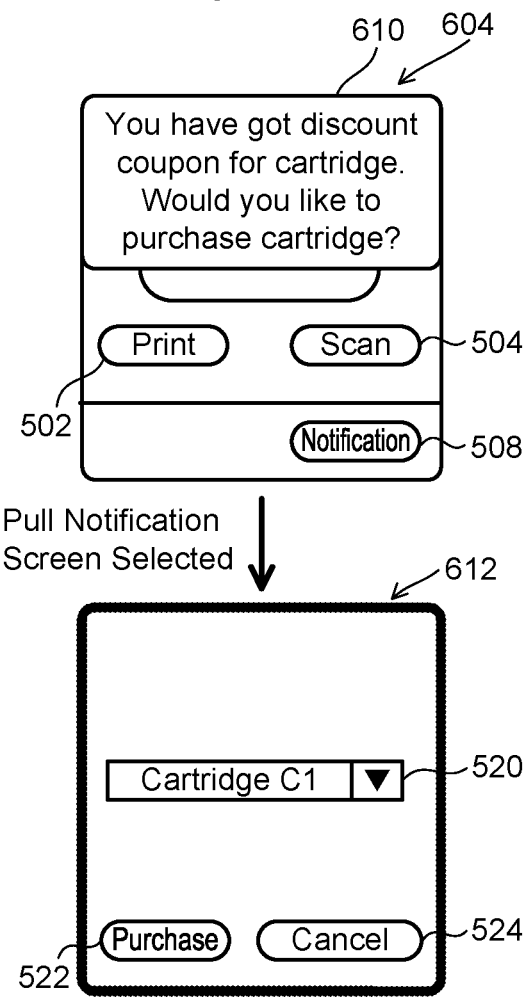
FIG. 7 illustrates an example of a pull notification screen displayed in the case in which a remaining amount is equal to or lower than a threshold.

(Pull Notification Screen 610 Displayed when Timing Condition "Remaining Amount≤Threshold" is Satisfied; FIG. 7)

With reference to FIG. 7, the pull notification screen 610 displayed when the pull notification information PL1 including "remaining amount≤threshold" as the timing condition (see FIG. 2) is received and the timing condition "remaining amount≤threshold" is satisfied (YES in S214 of FIG. 6) will be explained. The pull notification screen 610 is a screen corresponding to the pull notification screen data MD1 in the pull notification information PL1. On the pull notification screen 610, a message indicating that a discount coupon for a cartridge is received and a message inquiring whether the user wants to purchase a cartridge are displayed.

When the app 138 accepts an operation to select the pull notification screen 610, the app 138 supplies a URL corresponding to the cartridge purchase page 612 to the OS 136. The OS 136 accesses the URL and displays the cartridge purchase page 612 on the display 114. The cartridge purchase page 612 includes a cartridge selection box 520 for selecting a type of cartridge to be purchased, a purchase button 522 and a cancel button 524. As described above, the user can easily purchase a cartridge in response to selecting the pull notification screen 610. Under the situation in which a remaining amount of the cartridge attached to the MFP 10A is lower than the threshold, the information displayed on the pull notification screen 610 is beneficial to the user. Accordingly, the beneficial information can be provided to the user, by which user convenience can be enhanced.

Figure 8:
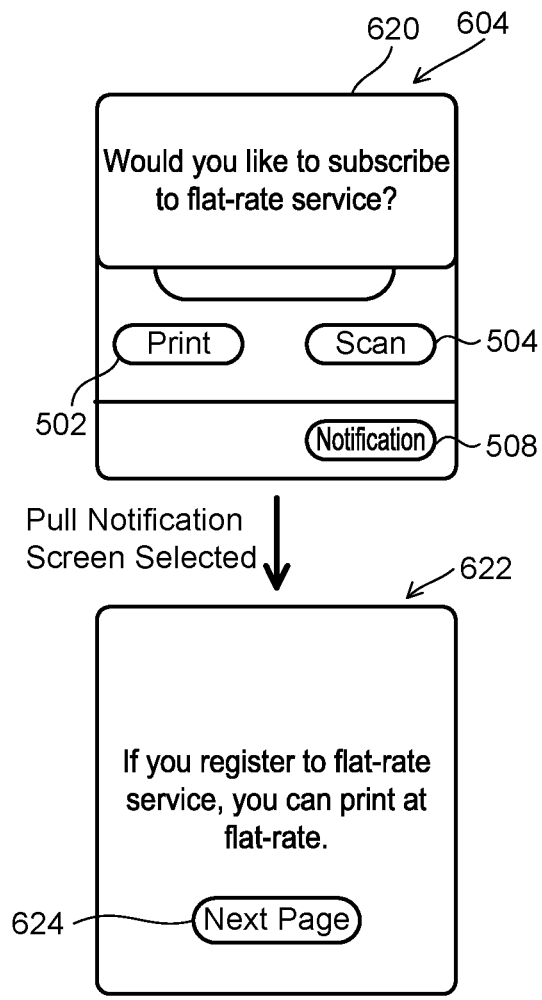
FIG. 8 illustrates an example of the pull notification screen displayed after a contract for a remote print service is signed.

(Pull Notification Screen 620 Displayed when Timing Condition "Remote Print Service Registered" is Satisfied; FIG. 8)

With reference to FIG. 8, the pull notification screen 620 displayed when the pull notification information PL2 including "remote print service registered" as the timing condition (see FIG. 2) is received and the timing condition "remote print service registered" is satisfied (YES in S214 of FIG. 6) will be described. The pull notification screen 620 is a screen corresponding to the pull notification screen data MD2 in the pull notification information PL2. On the pull notification screen 620, a message to prompt the user to subscribe to the flat-rate service is displayed.

When the app 138 accepts an operation to select the pull notification screen 620, the app 138 displays the flat-rate service introduction screen 622 on the display 114. The flat-rate service introduction screen 622 includes a message explaining contents of the flat-rate service and a button 624 to proceed to the next page. Consequently, it is possible to introduce the contents of the flat-rate service to the user and prompt the user to subscribe to the flat-rate service. To the user using the remote print service, information related to a service different from the remote print service (specifically, the flat-rate service) is beneficial. Accordingly, the beneficial information can be provided to the user, by which user convenience can be enhanced. In the present embodiment, in particular, the user can subscribe to the flat-rate service by using the user name used for the remote print service. In other words, the user can easily subscribe to the flat-rate service.

Figure 9:
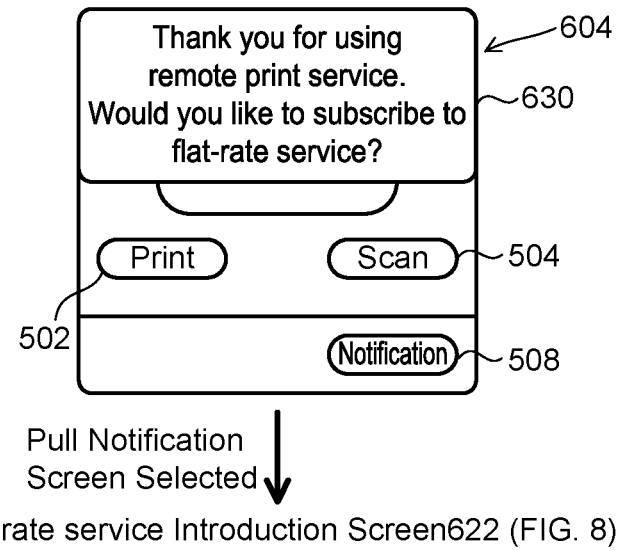
FIG. 9 illustrates an example of the pull notification screen displayed after the contract for the remote print service is canceled.

(Pull Notification Screen 630 Displayed when Timing Condition "Remote Print Service Canceled" is Satisfied; FIG. 9)

With reference to FIG. 9, the pull notification screen 630 displayed when the pull notification information PL3 including "remote print service canceled" as the timing condition (see FIG. 2) is received and the timing condition "remote print service canceled" is satisfied (YES in S214 of FIG. 6) will be described. The pull notification screen 630 is a screen corresponding to the pull notification screen data MD3 in the pull notification information PL3. On the pull notification screen 630, a message expressing gratitude for the user who was using the remote print service and a message to prompt the user to subscribe to the flat-rate service are displayed.

When the app 138 accepts an operation to select the pull notification screen 630, the app 138 displays the flat-rate service introduction screen 622 (see FIG. 8) on the display 114. Consequently, it is possible to introduce the contents of the flat-rate service to the user and prompt the user to subscribe to the flat-rate service. To the user who was using the remote print service, information related to a service different from the remote print service (specifically, the flat-rate service) is beneficial. Accordingly, the beneficial information can be provided to the user, by which user convenience can be enhanced.

Figure 10:
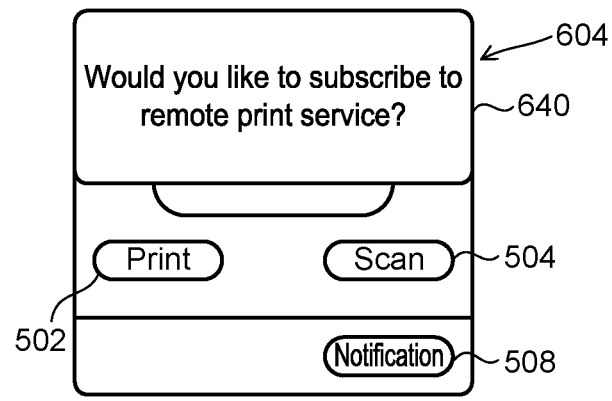

(Pull Notification Screen 640 Displayed when Timing Condition "Power On" or "Internet Connection Completed" is Satisfied; FIG. 10)

With reference to FIG. 10, a pull notification screen 640 displayed when the pull notification information including "power on" or "Internet connection completed" as the timing condition is received and the timing condition "power on" or "Internet connection completed" is satisfied (YES in S214 of FIG. 6) will be described. The pull notification screen 640 is a screen corresponding to the pull notification screen data in the pull notification information. On the pull notification screen 640, a message to prompt the user to subscribe to the remote print service is displayed. In a modification, a message to prompt the user to subscribe to the flat-rate service may be displayed on the pull notification screen 640.

When the app 138 accepts an operation to select the pull notification screen 640, the app 138 displays the remote print service introduction screen (illustration omitted) including a message explaining contents of the remote print service on the display 114. Consequently, it is possible to introduce the contents of the remote print service to the user and prompt the user to subscribe to the remote print service. To the user using the MFP 10, the information related to a service related to the MFP 10 (e.g., the remote print service) is beneficial. Accordingly, the beneficial information can be provided to the user, by which user convenience can be enhanced.

Effects of Present Embodiment

As described above, the terminal device 100 receives the pull notification information from the notification server 200 (T52 of FIG. 3, S114 of FIG. 5). The terminal device 100 receives the device information from the MFP 10A (T36 of FIG. 3). When the timing condition related to the device information is satisfied (YES in S214 of FIG. 6), the terminal device 100 displays the pull notification screen on the display 114 (S242) while the terminal device 100 does not display the pull notification screen on the display 114 when the timing condition related to the device information is not satisfied (NO in S214). As described above, depending on whether the timing condition is satisfied, whether to display the pull notification information can be changed. Accordingly, user convenience can be enhanced.

When the timing condition is satisfied in the state in which the second registration information "not registered" indicating that the flat-rate service (specifically automatic order service) of shipping a cartridge for the MFP 10 is not provided to the user of the MFP 10 is stored in the memory 134 in FIG. 6 (YES in S214, YES in S218), the app 138 displays the pull notification screen on the display 114 (S242). When the timing condition is satisfied in the case in which the second registration information "registered" indicating that the flat-rate service is provided to the user is stored in the memory 134 (YES in S214, NO in S218), the app 138 does not display the pull notification screen on the display 114. In the state in which the flat-rate service is provided to the user, a cartridge may automatically be ordered. Thus, the information displayed on the pull notification screen related to the cartridge is not beneficial to the user. With the above configuration, the pull notification screen which is not beneficial to the user can be suppressed from being displayed on the display 114. Accordingly, user convenience can be enhanced.

(Corresponding Relationships)

The pull notification information is an example of "notification information". The MFPs 10A, 10B are examples of "communication device". The device information is an example of "device related information". The timing condition is an example of "predetermined condition".

The cartridge and the remaining amount information are an example of "consumable" and "use information", respectively. The flat-rate service is an example of "first service". The second registration information "not registered" and the second registration information "registered" are an example of "non-provision information" and "provision information", respectively. The remote print service is an example of "second service". The device information including the first registration information "registered" received after the device information including the first registration information "not registered" is received is an example of "contract information". The device information including the first registration information "not registered" received after the device information including the first registration information "registered" is received is an example of "cancel information". The remaining amount information, the timing condition "remaining amount≤threshold", and the pull notification screen 610 of FIG. 7 are an example of "first-type related information", "first-type predetermined condition" and "first-type notification information", respectively. The first contract information, the timing condition "remote print service registered", and the pull notification screen 620 of FIG. 8 are an example of "second-type related information", "second-type predetermined condition" and "second-type notification information", respectively.

T52 of FIGS. 3 and S114 of FIG. 5 are examples of "receive notification information". T36 of FIG. 3 is an example of "receive device related information". T242 of FIG. 6 is an example of "display the notification information on the display".

(First Modification) The "communication device" is not limited to the MFP, but may for example be a printer, a scanner, a copy machine or a facsimile.

(Second Modification) The "consumable" is not limited to a cartridge, but may for example be a print sheet or a toner. When the print sheet is an example of "consumable", the pull notification information may include a condition related to the print sheet (e.g., "number of printed sheet≤predetermined number of print sheet") as the timing condition. The device information includes the number information indicating the number of print sheets used by the MFP 10.

(Third Modification) S216, S218 of FIG. 6 can be omitted. In other words, when the timing condition is satisfied in the case in which the type information in the received pull notification is "purchased item" (YES in S214), the terminal device 100 adds the pull notification information to the notification list 144 regardless of the second registration information in the device table 142 being "not registered" or not.

(Fourth Modification) The device information may be information indicating that the contract for the remote print service is signed, and it may include contract information included only in the device information sent for the first time since the contract being signed. In the present modification, when the condition related to registration of the remote print service "remote print service registered" is a timing condition, the app 138 determines whether the timing condition is satisfied depending on whether the latest device information received from the MFP 10 includes the contract information or not in S214 of FIG. 6.

(Fifth Modification) The device information may be information indicating that the contract for the remote print service is canceled, and it may include the contract information included only in the device information sent for the first time since the contract is canceled. In the present modification, when the condition related to cancelation of the remote print service "remote print service canceled" is a timing condition, the app 138 determines whether the timing condition is satisfied depending on whether the latest device information received from the MFP 10 includes the cancel information or not in S214 of FIG. 6.

(Sixth Modification) In the above embodiments, the processes of FIGS. 3 to 10 are implemented by a software (e.g., the program 136, 138), however, at least one of these processes may be implemented by hardware such as a logic circuit. In the present disclosure, the phrase "at least one of A, B, and C" means "(A), (B), (C), (A and B), (A and C), (B and C) or (A, B and C)".

What is claimed is:

1. A non-transitory computer-readable recording medium storing computer-readable instructions for a terminal device, wherein the terminal device comprises:
a memory;
a processor; and
a display,
wherein the computer-readable instructions, when executed by the processor, cause the terminal device to:
receive notification information from a notification server via the Internet;
receive device related information which is related to a communication device from the communication device;
determine whether a predetermined condition is satisfied for displaying the notification information based on the device related information received from the communication device;
in a case where the notification information is received from the notification server and it is determined that the predetermined condition is not satisfied, not display the notification information on the display of the terminal device,
wherein the predetermined condition is satisfied in a case where the device related information includes use information indicating a use situation of a consumable of the communication device and the use situation indicated by the use information is a predetermined situation,
wherein in a case where the predetermined condition is satisfied by the use information being the predetermined situation under a state where non-provision information is stored in the memory and where the notification information is received from the notification server, display the notification information on the display of the terminal device; and
wherein in a case where the predetermined condition is satisfied by the use information being the predetermined situation under a state where the provision information is stored in the memory and where the notification information is received from the notification server, not display the notification information on the display of the terminal device,
the non-provision information indicates that a first service for sending the consumable of the communication device is not provided to a user of the communication device, and
the provision information indicates that the first service is provided to the user.

2. The non-transitory computer-readable recording medium as in claim 1, wherein
the consumable is a cartridge,
the use information indicates a remaining amount of the cartridge,
and the predetermined situation is where the remaining amount of the cartridge indicated by the use information is less than or equal to a threshold.

3. The non-transitory computer-readable recording medium as in claim 1, wherein
in a case where the device related information includes contract information, the predetermined condition is satisfied, and in a case where the notification information is received from the notification server, the computer-readable instructions, when executed by the processor, cause the terminal device to display the notification information on the display of the terminal device, and
the contract information indicates that a contract for receiving a second service has been signed by a user of the communication device.

4. The non-transitory computer-readable recording medium as in claim 1, wherein
in a case where the device related information includes cancel information, the predetermined condition is satisfied, and in a case where the notification information is received from the notification server, the computer-readable instructions, when executed by the processor, cause the terminal device to display the notification information on the display of the terminal device, and the cancel information indicates that a contract for receiving a second service has been canceled by a user of the communication device.

5. The non-transitory computer-readable recording medium as in claim 1, wherein in a case where the device related information includes connection completion information, the predetermined condition is satisfied, and in a case where the notification information is received from the notification server, the computer-readable instructions, when executed by the processor, cause the terminal device to display the notification information on the display of the terminal device, and the connection completion indicates that the communication device has been connected to the Internet.

6. The non-transitory computer-readable recording medium as in claim 1, wherein in a case where the device related information includes power information, the predetermined condition is satisfied, and in a case where the notification information is received from the notification server, the computer-readable instructions, when executed by the processor, cause the terminal device to display the notification information on the display of the terminal device, and the power information indicates that the communication device has been powered on from off.

7. The non-transitory computer-readable recording medium as in claim 1, wherein the notification information includes a message related to a service provided to a user of the communication device.

8. The non-transitory computer-readable recording medium as in claim 1, wherein the predetermined condition is set by the notification server.

9. The non-transitory computer-readable recording medium as in claim 1, wherein the device related information includes first-type related information and second-type related information different from the first-type related information, wherein in a case where a first-type predetermined condition related to the first-type related information is satisfied, first-type notification information related to the first-type related information is displayed on the display, and in a case where a second-type predetermined condition different from the first-type predetermined condition and related to the second-type related information is satisfied, second-type notification information different from the first-type related information and related to the second-type related information is displayed on the display.

10. A non-transitory computer-readable recording medium storing computer-readable instructions for a terminal device, wherein the terminal device comprises:

a processor; and a display, wherein the computer-readable instructions, when executed by the processor, cause the terminal device to:

receive notification information from a notification server via the Internet;

receive device related information which is related to a communication device from the communication device;

determine whether a predetermined condition is satisfied for displaying the notification information based on the device related information received from the communication device;

in a case where the notification information is received from the notification server and it is determined that the predetermined condition is satisfied, display the notification information on the display of the terminal device; and in a case where the notification information is received from the notification server and it is determined that the predetermined condition is not satisfied, not display the notification information on the display of the terminal device, wherein in a case where the device related information includes contract information, the predetermined condition is satisfied, and the contract information indicates that a contract for receiving a service has been signed by a user of the communication device.

11. The non-transitory computer-readable recording medium as in claim 10, wherein the predetermined condition is satisfied in a case where the device related information includes use information indicating a use situation of a consumable of the communication device and the use situation indicated by the use information is a predetermined situation.

12. The non-transitory computer-readable recording medium as in claim 11, wherein the consumable is a cartridge, the use information indicates a remaining amount of the cartridge, and the predetermined situation is where the remaining amount of the cartridge indicated by the use information is less than or equal to a threshold.

13. The non-transitory computer-readable recording medium as in claim 10, wherein the predetermined condition is satisfied in a case where the device related information includes cancel information indicating that a contract for a service has been canceled by the user of the communication device.

14. The non-transitory computer-readable recording medium as in claim 10, wherein the predetermined condition is satisfied in a case where the device related information includes connection completion information indicating that the communication device has been connected to the Internet.

15. The non-transitory computer-readable recording medium as in claim 10, wherein the predetermined condition is satisfied in a case where the device related information includes power information indicating that the communication device has been powered on from off.

16. The non-transitory computer-readable recording medium as in claim 10, wherein the notification information includes a message related to a service provided to a user of the communication device.

17. The non-transitory computer-readable recording medium as in claim 10, wherein the predetermined condition is set by the notification server.

18. The non-transitory computer-readable recording medium as in claim 10, wherein the device related information includes first-type related information and second-type related information different from the first-type related information, wherein in a case where a first-type predetermined condition related to the first-type related information is satisfied, first-type notification information related to the first-type related information is displayed on the display, and in a case where a second-type predetermined condition different from the first-type predetermined condition and related to the second-type related information is satisfied, second-type notification information different from the first-type related information and related to the second-type related information is displayed on the display.

19. A non-transitory computer-readable recording medium storing computer-readable instructions for a terminal device, wherein the terminal device comprises:

a processor; and a display, wherein the computer-readable instructions, when executed by the processor, cause the terminal device to:

receive notification information from a notification server via the Internet;

receive device related information which is related to a communication device from the communication device;

determine whether a predetermined condition is satisfied for displaying the notification information based on the device related information received from the communication device;

in a case where the notification information is received from the notification server and it is determined that the predetermined condition is satisfied, display the notification information on the display of the terminal device; and in a case where the notification information is received from the notification server and it is determined that the predetermined condition is not satisfied, not display the notification information on the display of the terminal device, wherein in a case where the device related information includes cancel information, the predetermined condition is satisfied, and the cancel information indicates that a contract for receiving a service has been canceled by a user of the communication device.

20. The non-transitory computer-readable recording medium as in claim 19, wherein the predetermined condition is satisfied in a case where the device related information includes use information indicating a use situation of a consumable of the communication device and the use situation indicated by the use information is a predetermined situation.

* * * * *